No. 842,055. PATENTED JAN. 22, 1907.
A. W. BARNARD.
DASH POT.
APPLICATION FILED MAY 4, 1905.

Witnesses:

Inventor:
Arthur W. Barnard
By Francis J. Dakin
Atty

UNITED STATES PATENT OFFICE.

ARTHUR W. BARNARD, OF NEWTON CENTER, MASSACHUSETTS, ASSIGNOR TO THE BARNARD COMPANY, OF BOSTON, MASSACHUSETTS, A CORPORATION OF MASSACHUSETTS.

DASH-POT.

No. 842,055.

Specification of Letters Patent.

Patented Jan. 22, 1907.

Application filed May 4, 1905. Serial No. 258,885.

*To all whom it may concern:*

Be it known that I, ARTHUR W. BARNARD, a citizen of the United States, residing at Newton Center, in the county of Middlesex and State of Massachusetts, have invented a new and useful Improvement in Dash-Pots, of which the following is a specification, reference being had therein to the accompanying drawings.

My invention relates to devices designed to check and retard vibrations in scales and like apparatus and to prevent the mechanism being jarred by any sudden or violent movement of the scale-beam or moving part.

This invention is shown and described, but not claimed, in an application for improvements in scales filed by me in the Patent Office February 7, 1905, Serial No. 244,530.

Heretofore in the ordinary construction of dash-pots the cylinder of the dash-pot has been fixedly attached or fastened to some portion of the scale or the apparatus to which it has been applied and the piston or plunger-rod has been connected to the scale-beam or moving member. This construction, however, has always been open to the objection that, the cylinder being immovable, any change in the position or motion of the piston-rod or of the moving part to which it was attached caused the piston or plunger to come into frictional contact with the inner surfaces of the cylinder, and thereby engendered a frictional resistance which destroyed the efficiency of the dash-pot and seriously reduced the sensitiveness and accuracy of the scale. This result has been especially noticeable in the use of dash-pots on scales, for the reason that continual use of the scale causes the knife-edge bearings upon which the scale-beam is mounted to wear away and become dull and permits a lateral movement of the scale-beam. As a consequence of this lateral movement the piston-rod is deflected and the plunger scrapes the sides of the cylinder and may possibly jam.

The object of my invention is to overcome the above objections by so constructing my dash-pot that any change in the position or the motion of the moving parts, due to displacement, wear, or other cause, will not affect the operation or efficiency of the dash-pot or the scale or other apparatus to which it is applied. In other words, the object of my invention is to secure a dash-pot which is efficient under all conditions and which will automatically adapt itself to changes in the machine caused by wear or other conditions.

The following is a clear description of my invention, reference being made to the accompanying drawings, in which—

Figure 1:
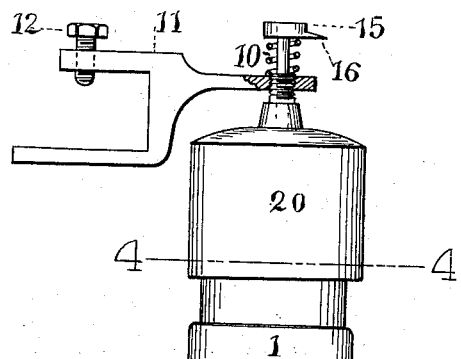
Figure 2:
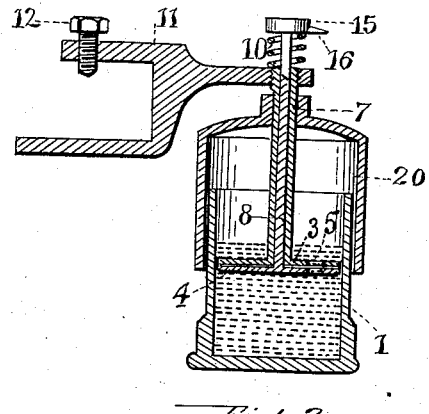
Figure 3:
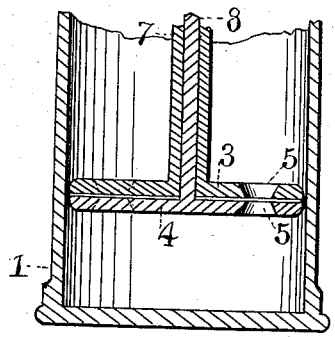
Figure 4:
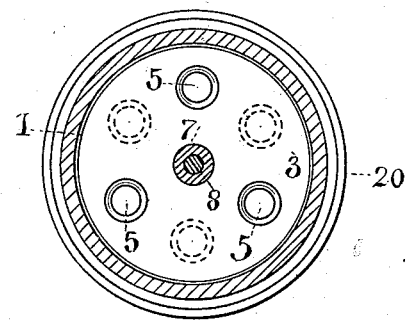
Figure 5:
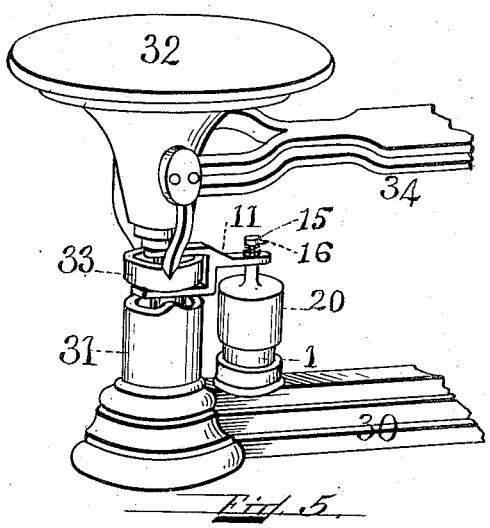
Figure 6:
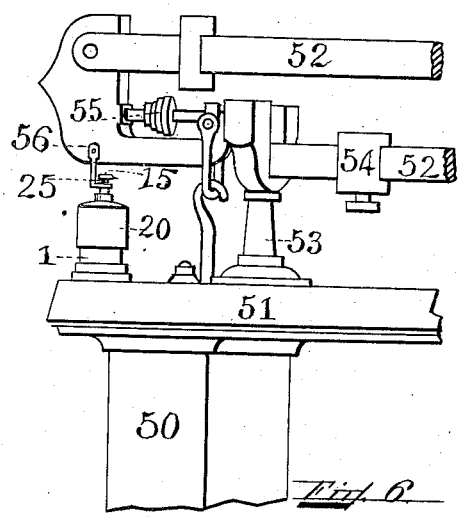

Figure 1 is a side elevation of my dash-pot. Fig. 2 is a vertical sectional view of the same. Fig. 3 is a vertical sectional view of the lower part of my device on an enlarged scale. Fig. 4 is a horizontal cross-sectional view, on an enlarged scale, on the line 4 4 in Fig. 1. Fig. 5 is a view in perspective of one platform of an even-balance scale having my device adjusted thereto; and Fig. 6 is a view in perspective of a portion of a multiple-beam scale, showing my dash-pot attached thereto.

Similar numbers refer to similar parts throughout the several views.

Broadly, my device consists of a free cylinder and a plunger or piston moving therein, the rod of which is connected to the beam of the scale or to the moving member of the apparatus.

In the drawings, 1 represents a cylinder open at the top and containing glycerin, oil, or other suitable fluid, in which moves a piston or plunger consisting of concentric disks 3 and 4, each provided with a plurality of openings 5 5, which register with each other when adjusted. The disks 3 and 4 are fixedly mounted on the ends of a hollow stem 7 and of a rod 8, respectively, the latter being rotatably mounted within the former.

The upper end of the hollow stem 7 is provided on its outer surface with a screw-thread in order that the stem 7 may be screwed into the end of and supported by the forked arm 11, which is attached to the moving member of the scale or the beam by means of a thumb-screw 12. Above the top of the hollow stem 7 extends the rod 8, which is capped by a thumb-piece 15, the latter being provided with a spur or pointer 16. The thumb-piece 15 is used to turn the rod 8 and the disk 4 for the purpose of causing the openings in the disk 4 to register with the openings in the disk 3, in which event the plunger is open. The disk 3, affixed to the hollow stem 7, is not to be rotated, the plunger being opened or closed by rotating the disk 4 through the medium of the thumb-piece 15, and the position of the pointer 16 indicates whether the plunger is opened, partially closed, or closed. For the purpose of binding together at all times the two disks 3 and 4 I mount upon the rod 8 between the thumb-piece 15 and the top of the hollow stem 7 a spiral spring 10. By thus binding together the two disks 3 and 4 I also prevent any accidental opening or closing of the plunger through the disk 4 being rotated by a jar or otherwise, since, owing to the binding effect of spring 10, it requires some force to turn the thumb-piece 15 and the disk 4.

For the purpose of eradicating to the greatest possible extent the friction in the dash-pot I so bevel the outer edges of disks 3 and 4 that a cutting edge is formed where the two disks touch. The openings 5 5 in both disks are similarly beveled. This enables the plunger to cut through the liquid in the cylinder with the least possible friction.

To prevent the intrusion of dust, dirt, or other foreign matter which might cause friction or clog the dash-pot, I furnish a hood 20, mounted upon the stem 7 and moving up and down with the stem 7 and the plunger. I make this hood of a diameter sufficiently large to enable it to inclose the cylinder and yet not contact it at any point.

In applying my dash-pot to scales or other apparatus it is necessary to connect the plunger to the scale-beam or moving member at a point where it may act effectively and to have the cylinder supported by but not attached to a stationary portion of the apparatus. As a rule it is preferable to have the cylinder directly under the moving member, and the plunger-rod may then be connected to the moving part by another rod or any other suitable means; but it is evident that the position of the cylinder and the means for attaching the plunger-rod to the moving part may be varied to conform to the shape of the apparatus and other conditions.

I have shown in Figs. 5 and 6, respectively, the methods of applying my dash-pot to even-balance and multiple-beam scales. Referring to Fig. 5, in which is shown a portion of an even-balance scale, 30 represents a base portion, 31 a side standard, 32 a platform provided with a lower portion 33 and hung on one end of a beam 34. The cylinder 1 of my dash-pot is placed upon the base portion 30, but is not attached thereto, and the plunger is connected to the scale-beam through the medium of the forked arm 11, which incloses and is fastened by the thumb-screw 12 to the lower portion 33 of the platform 32. As the platform 32 and its lower portion 33 are mounted on the end of the scale-beam 34 and move with it, the plunger is therefore carried up and down with the oscillations of the scale-beam. The cylinder 1 of the dash-pot, although not attached to any portion of the apparatus, has but a limited sidewise movement, since the plunger serves to retain the cylinder in its original position and the latter moves horizontally only to conform to a similar movement of the former. In Fig. 6 is shown the method of adjusting my dash-pot to a multiple-beam scale, in which case I dispense with the forked arm 11 and use in place thereof a rod 25, having its lower end turned horizontally and bored to receive the stem 7 in the same manner as does the forked arm 11. The upper end of the rod 25 is pivotally attached to the scale-beam.

In Fig. 6, 50 designates a support, and 51 a table, on which is mounted a multiple beam 52, balanced in a standard 53 and having a sliding weight 54 and a screw-weight 55. The dash-pot is placed upon the table 51 and connected, by means of the bar 25, to the scale-beam 52 at 56, where it will not interfere with the sliding weight or other parts of the scale. As thus mounted on and adjusted to scales or other apparatus my dash-pot is not open to the objections which apply to dash-pots having a fixed cylinder, for the reason that when the plunger in my construction is moved in a sidewise direction, owing to wear and tear or displacement of the moving member, the cylinder naturally follows it, and plunger and cylinder at all times maintain to each other the same relative position. This action keeps the plunger from frictional contact with the interior surface of the cylinder. Furthermore, the plunger is smaller in diameter than the inside diameter of the cylinder, which leaves a narrow space between plunger and cylinder, allows the liquid to pass through that space when the plunger is moved, and tends to prevent the plunger contacting the cylinder. As a result of this construction there is no friction between plunger and cylinder.

In operation my dash-pot acts as follows for the purpose of retarding and lessening the vibrations of the moving parts: The plunger being attached to the moving member is by its action moved upwardly and downwardly in the cylinder and encounters the resistance of the liquid contained in the cylinder, and the extent to which the vibrations or oscillations of the scale-beam or moving part are retarded depends upon whether the plunger is open, partially open, or closed. This resistance is regulated entirely by the plunger. To lessen the vibrations of the scale-beam gradually, I open the plunger by turning the finger-piece 15, and therefore the rod 8 and disk 4, until the openings in disk 4 register with those in disk 3. This permits the liquid to flow through the openings 5 5 when the plunger is moved, and consequently the liquid offers less resistance to the movement of the plunger. If the disk 4 then be turned slightly, the openings in the two disks overlap, which reduces the size of the aperture through which the liquid can pass, and the resistance of the liquid to the movement of the plunger is increased, and this resistance is greatest when the plunger is entirely closed. If for any reason the scale-beam acquires a sidewise movement, the plunger being attached thereto will also move sidewise; but this does not affect the operation of the dash-pot, because the cylinder immediately adjusts itself to the new position of the plunger. At all times the tendency of the plunger is to move in the center of the cylinder, since the liquid flows between the plunger and cylinder, and if one side of the plunger contacts the cylinder the liquid will push the cylinder away from the contacting part of the plunger in its efforts to pass upward or downward between the two. The cylinder being free and unattached to the apparatus slides easily on its support and offers no resistance to the action of the liquid or to the pressure of the plunger when it bears more on one side than on the other. In other words, the cylinder automatically adjusts itself to the position of the plunger, and immediately corrects changes in the position or action of the latter. Owing to this action, the life of the dash-pot is continued indefinitely, and it never deteriorates in operation.

What I claim is—

In a dash-pot, the combination of a piston-rod, a piston mounted thereon and a cylinder within which said piston moves and which is unattached and free to be moved laterally by the movement of said piston.

In testimony whereof I have hereunto set my hand, in the presence of two subscribing witnesses, this the 28th day of March, 1905.

ARTHUR W. BARNARD.

Witnesses:
  CHARLES A. CARTLAND,
  E. F. UNIAC.